United States Patent [19]

Fekete

[11] Patent Number: 5,479,820
[45] Date of Patent: Jan. 2, 1996

[54] CRYOGENIC GAUGE

[75] Inventor: Nicholas M. G. Fekete, Richardson, Tex.

[73] Assignee: Rochester Gauges, Inc., Dallas, Tex.

[21] Appl. No.: 134,050

[22] Filed: Oct. 12, 1993

[51] Int. Cl.$^6$ ..................................... G01F 23/38
[52] U.S. Cl. ........................ 73/319; 73/DIG. 5; 116/285; 116/291; 116/303; 116/305
[58] Field of Search ................. 73/309, DIG. 5, 73/319, 322; 116/204, 228, 284, 285, 291, 303, 305

[56] References Cited

U.S. PATENT DOCUMENTS

| | | | |
|---|---|---|---|
| 885,675 | 4/1908 | Martin . | |
| 903,212 | 11/1908 | Martin . | |
| 1,754,203 | 4/1930 | Gibson | 116/308 |
| 1,796,398 | 3/1931 | Richardson | 116/308 |
| 1,950,142 | 3/1934 | Hastings et al. | 116/118 |
| 2,097,278 | 10/1937 | Hastings | 73/317 |
| 2,098,085 | 11/1937 | D'Arcey | 73/317 |
| 2,201,974 | 5/1940 | Andersson | 137/104 |
| 2,473,581 | 6/1949 | Ford | 177/327 |
| 2,524,261 | 10/1950 | Kaminky | 200/84 |
| 2,634,608 | 4/1953 | Sorber | 73/305 |
| 2,654,253 | 10/1953 | Ford | 73/431 |
| 2,669,123 | 2/1954 | Ballard | 73/317 |
| 2,678,060 | 5/1954 | Arne | 137/452 |
| 2,697,350 | 12/1954 | Sorber | 73/317 |
| 2,761,467 | 9/1956 | Arne | 137/452 |
| 2,784,273 | 3/1957 | Binford | 200/84 |
| 2,820,865 | 1/1958 | McKinnies | 200/84 |
| 3,234,792 | 2/1966 | Ririe et al. | 73/309 |
| 3,320,922 | 5/1967 | Taylor et al. | 116/118 |
| 3,397,577 | 8/1968 | Siebert | 73/309 |
| 3,412,609 | 11/1968 | Kaletka et al. | 73/308 |
| 3,709,038 | 1/1973 | Werner | 73/313 |
| 3,826,139 | 7/1974 | Bachman | 73/311 |
| 3,942,526 | 3/1976 | Wilder et al. | 128/214 |
| 3,977,248 | 8/1976 | Metzger | 116/204 X |
| 4,064,907 | 12/1977 | Billington et al. | 137/614.2 |
| 4,142,419 | 3/1979 | Fenne et al. | 73/440 |
| 4,186,419 | 1/1980 | Sims | 361/178 |
| 4,313,459 | 2/1982 | Mylander | 137/416 |
| 4,329,550 | 5/1982 | Verley | 200/84 |
| 4,416,211 | 11/1983 | Hoffman | 116/204 |
| 4,441,860 | 4/1984 | Tsujimoto | 417/40 |
| 4,483,367 | 11/1984 | Ross, Jr. et al. | 137/416 |
| 4,537,061 | 8/1985 | DeMeyer et al. | 73/309 X |
| 4,554,494 | 11/1985 | Howeth | 318/482 |
| 4,580,450 | 4/1986 | Ota et al. | 73/313 |
| 4,635,480 | 1/1987 | Hrncir et al. | 73/322.5 |
| 4,911,011 | 3/1990 | Fekete et al. | 73/313 |
| 5,072,618 | 12/1991 | Taylor et al. | 73/317 |
| 5,079,950 | 1/1992 | McKiernan et al. | 73/313 |

FOREIGN PATENT DOCUMENTS 724338   2/1955   United Kingdom .

Primary Examiner—William A. Cuchlinski, Jr.
Assistant Examiner—Willie Morris Worth
Attorney, Agent, or Firm—Richards, Medlock & Andrews

[57] ABSTRACT

A gauge for measuring fluid level, especially cryogenic fluids, having a head assembly with a passageway to receive the upper portion of a lift rod assembly. The lift rod assembly includes a spring attached at the upper end to the head and at the lower end attached to a spring guide. A lift rod is mounted adjustably on the spring guide, and the upper end of the lift rod has attached a magnet and the lower end of the lift rod a displacement member. The upper end of the lift rod is received in the passageway of the head. Attached to the head adjacent to the passageway is a dial assembly adjustably mounted in relation to the passageway of the head.

12 Claims, 2 Drawing Sheets

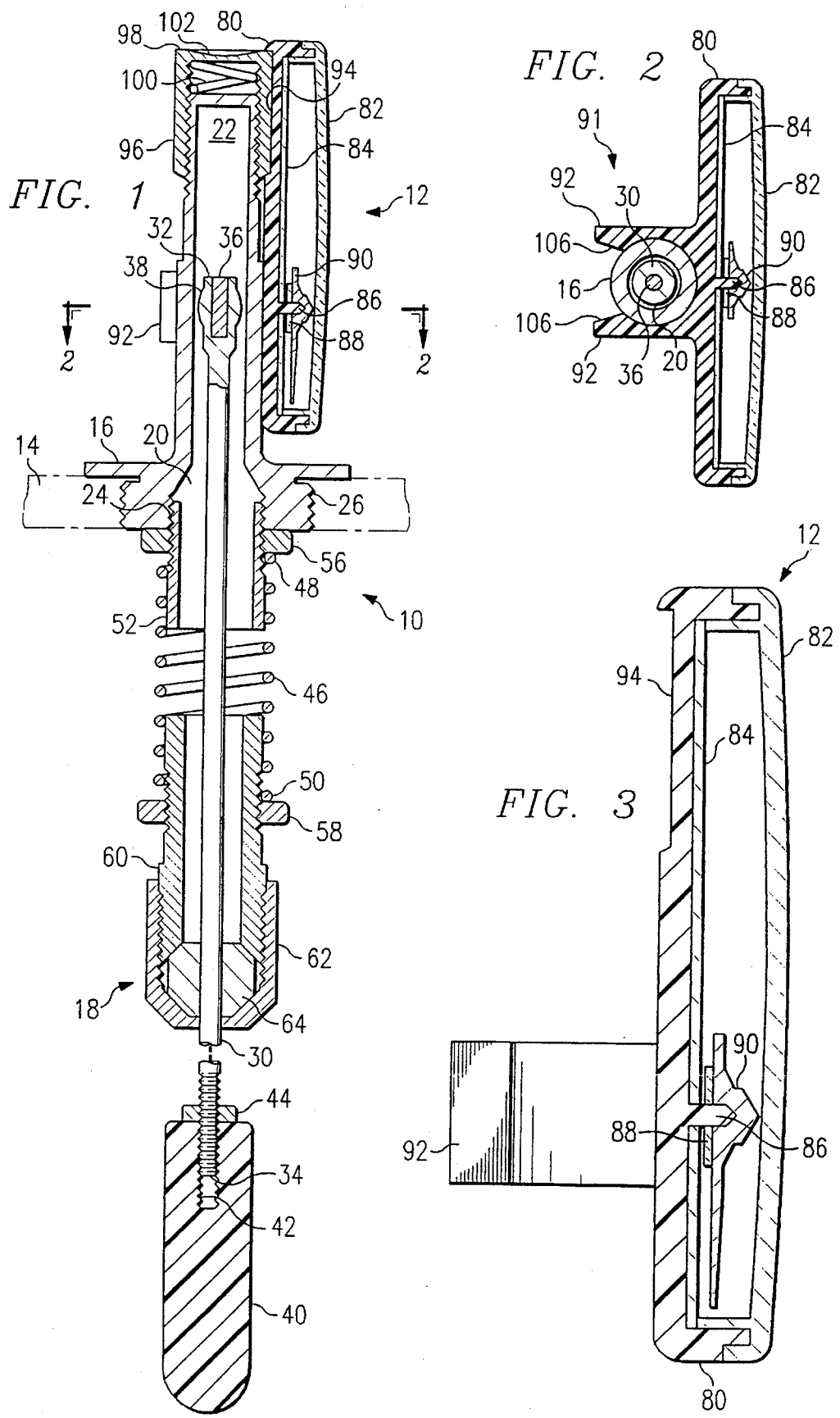

CRYOGENIC GAUGE

TECHNICAL FIELD OF THE INVENTION

The present invention relates to gauges, and in particular, gauges for use with cryogenic liquids.

BACKGROUND OF THE INVENTION

Cryogenic fluids pose unique problems in providing suitable gauges for storage vessels. Cryogenic fluids are gases at standard temperature and pressure. To liquefy these gases requires compression, and thus, storage of the liquefied gas is normally done by containment of the liquid gas in a pressure vessel. Standard pressure vessels for these liquefied gases are typically cylinders which have a relatively small diameter in comparison to their height. Many common storage vessels have a diameter of about sixteen inches and a length of sixty inches or more. A large variety of cryogenic fluids can be stored in such vessels, such as liquid nitrogen, liquid oxygen, liquid carbon dioxide, liquid propane, liquid natural gas, etc. These liquefied gases have varying densities in the liquid state. Thus, a single gauge is not suitable for each liquid. The present invention provides for a gauge assembly utilizing a float and has many advantages. The gauge utilizes a simple float assembly which can be easily adjusted for the densities of various fluids, thus allowing the same assembly to be utilized for different fluids with simple adjustments to the gauge. The gauge also includes a dial indicator that is adjustable to allow changing and calibration of the set point. Further, the gauge is durable and of long-lasting construction.

SUMMARY OF THE INVENTION

In one aspect, the invention relates to a float assembly for a cryogenic gauge which has a head that defines a passageway to receive the upper portion of a lift rod on which is mounted a magnet. One end of a spring is attached to the bottom of the head and the second end of the spring is adjustably attached to a lift rod. Attached to one end of the lift rod is a float for immersion in liquid, and at the upper end of the lift rod is a magnet which is received in a slidable fashion in the passageway of the head. In the preferred embodiment, the lift rod is adjustably attached to the lower end of the spring by a lock nut.

In another aspect, the present invention relates to a dial assembly for use in conjunction with a magnet that moves in response to the fluid level in a vessel. The dial assembly has a base with first and second sides. A pivot pin extends from the first side of the base. A pointer assembly is pivotally mounted on the pivot pin. The pointer can be magnetized or attached to a magnet which is also mounted on the pivot pin. Thus, by magnetic coupling, the pointer assembly moves in response to a magnet which travels in response to changes in fluid level in a vessel. A snap clamp projects from the second side of the base and a adjustment nut engaging surface is present on the second side of the base. Thus, the dial assembly is constructed such that its position will vary with changes in adjustment nut position.

In another aspect, the present invention relates to a gauge assembly combining a float assembly and a dial assembly. The float assembly is comprised of a head which defines a passageway to receive the upper portion of a lift rod with magnet. One end of a spring is attached to the lower end of the passageway, and the other end of the spring is adjustably attached to a lift rod at a point along its length. At the top end of the lift rod is mounted a magnet, and at the bottom end of the lift rod is mounted a float. An adjustment nut is mounted adjacent to the upper end of the passageway and dimensioned for cooperation with the dial assembly. The dial assembly has a base with first and second sides. Protruding from the first side is a pivot pin, and protruding from the second side is a snap clamp. The second side also defines a set nut engaging surface for engaging the adjustment nut on the float assembly, whereby adjustment of the adjustment nut position adjusts the position of the dial along the passageway of the head assembly in which the magnet attached to the lift arm travels.

BRIEF DESCRIPTION OF THE DRAWINGS

Further aspects and advantages of this invention will become apparent from the following detailed description taken in conjunction with the accompanying drawings in which:

FIG. 1 is a cross-sectional view of one embodiment of the present invention;

FIG. 2 is a top cross-sectional view of FIG. 1 at line 2—2;

FIG. 3 is a cross-sectional view of the dial assembly of the present invention;

DETAILED DESCRIPTION

Figure 4:
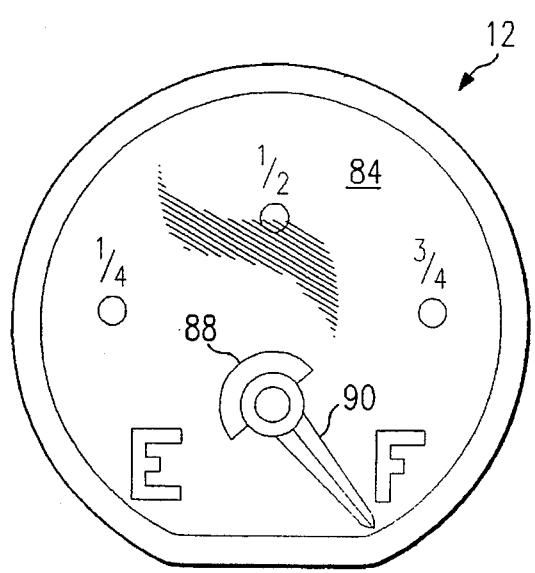
FIG. 4 is a frontal view of the dial assembly of the present invention.

The present invention relates to a gauge assembly extremely useful for use with cryogenic materials. It is also useful for other liquids stored in vessels having a small diameter in comparison to their height, which present unique problems in providing a simple gauge assembly. The present invention provides a gauge in which the magnet which moves in response to changes in liquid level and used to communicate the liquid level in a tank moves a very short distance, but yet provides reasonably accurate measurements.

FIG. 1 shows a float assembly 10 with a dial indicator 12 attached to the float assembly, thereby producing a complete gauge attached to wall of vessel 14 shown in phantom. Float assembly 10 has two major components: a head 16 and a lift assembly indicated generally as 18. Head 16 defines a passageway 20 having a first end 22 and a second end 24. Preferably, head 16 is provided with threads 26 for screwing the head into the wall of the vessel.

Passageway 20 of head 16 receives the upper portion of lift assembly 18 in a slidable fashion. Lift assembly 18 has a lift rod 30 with a first end 32 and a second end 34. Attached to first end 32 of the lift rod 30 is magnet 36. Also preferably, first end 32 of lift rod 30 has a bearing or camming surface 38 for sliding contact with the wall of passageway 20. Bearing surface 38 does not have to be in contact with the wall of passageway 20, and preferably, a space is provided between the upper end of lift rod 30 and the walls of the passageway to allow for easy movement.

At the second end 34 of lift rod 30 is a float (displacement member) 40. While "float" generally means an item which has a lower density (specific gravity) than the fluid, "float" is used in this application to refer to a member which has a density greater than the fluid in which it is immersed, and thus, it does not float on the surface of the fluid. However, the member does displace fluid, and that displacement of fluid affects the position of lift rod 30. Thus, in this application, the float will be referred to as either the float or displacement member. Float 40 may be an integral section of the lift rod or just the lower portion of lift rod 30. In the preferred embodiment, float 40 has a threaded passageway 42 which receives second end 34 of lift rod 30. A nut 44 is positioned adjacent to float 40 and engages threaded surfaces on the lift rod 30 so as to lock the position of the float on the second end of the lift rod. In this manner, the position of the float on the second end of the lift rod may be adjusted, thereby providing one mechanism for adjustment of the lift assembly such that the same assembly can be used for different fluids.

Lift assembly 18 also includes a tension spring 46 having a first end 48 and a second end 50. In the preferred embodiment, first end 48 is attached to a first spring guide 52, which is attached to second end 24 of passageway 20. This may be done by threaded surfaces on the inside of passageway 20 and on the outside of spring guide 52. The position of spring guide 52 is locked into position by set nut 56. This construction provides yet another means for adjusting the position of lift assembly 18 in passageway 20. Attached to the second end 50 of tension spring 46 is a second set nut 58, which engages threaded surfaces on second spring guide 60. This provides a means for adjusting the tension which tension spring 46 imparts between first and second spring guides 52 and 60. Spring guide 60 receives lock nut 62, and disposed adjacent to the end of spring guide 60 and lock nut 62 is ferrule 64. Lift rod 30 passes through lock nut 62 and ferrule 64. When lock nut 62 is loosened, lift rod 30 may be moved with respect to lock nut 62 and ferrule 64. Once second spring guide 60 is positioned at a predetermined location along lift rod 30, lock nut 62 is tightened, thereby pushing ferrule 64 against spring guide 60 and locking lift guide 30 at a desired position. This then offers another means by which to vary the position of lift assembly 18 within passageway 20.

In operation, float assembly 10 is attached to vessel 14. Typically, vessels for cryogenic fluids will have relatively small diameters in relation to their heights. If float 40 floated on the surface of the fluid, then passageway 20 would need to be as long as the vessel, which is not practicable. Thus, the present gauge employs a float 40 which has a density greater than the fluid contained in the vessel. Float 40 in cooperation with tension spring 46 allows a construction whereby the movement of magnet 36 in passageway 20 is a small fraction of the total depth of the vessel. As fluid rises around float 40, it will buoy the float to some extent, thereby allowing tension spring 46 to draw the float higher, thereby allowing magnet 36 to rise. Thus, in the preferred embodiment, the float is long and narrow.

A dial assembly is provided to give a visual readout. The dial assembly may be fixed to the head, but preferably is adjustable. Dial indicator 12 allows the user to read the liquid level in the vessel as the pointer moves in response to movement of magnet 36 on lift rod 30. Dial indicator 12 is attached to head 16 adjacent to passageway 20. In the preferred embodiment, dial indicator 12 has a base 80, a crystal 82 attached to the base, a dial face 84 with printed indicia of level. Projecting from the first side of the base 80 is a pivot pin 86. Mounted pivotally on pivot pin 86 is a magnet 88 and pointer 90. As magnet 36 moves within passageway 20, it will magnetically couple with magnet 88 attached to pointer 90. As position of magnet 36 varies along passageway 20, the position of magnet 88 will vary, thereby moving pointer 90 to indicate liquid level.

In the preferred embodiment, dial indicator 12 is adjustably attached to head 16, and preferably, is attached by spring clamp projection 92, which provides sufficient tension to hold dial indicator 12 on head 16, but also permits dial indicator 12 to be slid along head 16 in an area adjacent to passageway 20. Adjustment of the dial position with relation to head 16 is provided by a adjustment nut engaging surface 94 on the back of base 80 which cooperates with and receives the edge of adjustment nut 96. In the embodiment illustrated, adjustment nut engaging surface 94 is an indentation on the rear side of dial base 80. In the preferred embodiment, adjustment nut 96 is threadably received on the outer surface of head 16 adjacent to first end 22 of passageway 20. Interposed between the top 98 of adjustment nut 96 and the top of head 16 is adjustment nut spring 100. Adjustment nut spring 100 provides tension against the adjustment nut to minimize or prevent accidental movement of adjustment nut 96. Adjustment nut 96 also has a slot 102 on the top surface for receiving a screwdriver or similar instrument. Thus, a raising or lowering of adjustment nut 96 results in a corresponding movement of dial indicator 12. Thereby, the relation of magnets 88 and 36 can be varied, which allows changing in the set point of the dial assembly to either calibrate the gauge initially or to change the set point for different liquids.

Dial indicator 12 is shown in further detail in FIGS. 2, 3 and 4. FIG. 2 is a cross-section of the dial assembly along line 2—2 of FIG. 1. Like numbers refer to like parts. In the preferred embodiment, base 80 is made of suitable plastic and spring clamp 91 is formed by two projections 92 extending from the rear portion of base 80. The two projections 92 of spring clamp 91 have camming surfaces 106, which assists in spreading of projections 92 in order to press the projections over base 16, then allowing spring clamp 91 to close in a fashion partially surrounding head 16. FIGS. 3 and 4 show the dial assembly in greater detail, with like numbers representing like features.

The gauge assembly may be constructed from any suitable material. In the preferred embodiment, the gauge is utilized with cryogenic fluids, and thus, should be made from material which does not become brittle when exposed to low temperatures. Suitable materials for construction include aluminum, brass, titanium, stainless steel, and various metal alloys. The spring is preferably made from stainless steel. Most plastics are brittle at low temperatures, with the exception of Teflon®. However, some fiber-reinforced plastics can show relatively good properties at low temperatures. Thus, most materials used in the float assembly will be metal or metal alloy. Teflon® could be employed for bearing surface 38 if so desired. The components of the dial assembly are preferably made from plastic materials, although the base may be made of metal and the crystal made of glass.

Liquefied gases can have wide ranging densities in the liquid state. The following table gives the density in pounds per cubic foot for various liquefied gases.

| LIQUEFIED GAS | DENSITY POUNDS PER CUBIC FOOT AT NORMAL BOILING TEMPERATURE |
| --- | --- |
| Helium | 7.803 |
| Hydrogen | 4.43 |
| Neon | 75.35 |
| Air | 54.56 |
| Nitrogen | 50.4 |
| Oxygen | 71.24 |

-continued

| LIQUEFIED GAS | DENSITY POUNDS PER CUBIC FOOT AT NORMAL BOILING TEMPERATURE |
|---|---|
| $CH_4$ | 26.48 |

The density of most stainless steel alloys ranges from 0.2 to 0.3 pounds per cubic inch (345.6 to 518.4 pounds per cubic foot). The density of most aluminum alloys range between 0.093 and 0.101 pounds per cubic inch (160.7 to 174.5 pounds per cubic foot). Thus, the displacement member (float) can be made from various alloys or a combination of alloys to provide the desired density with respect to the fluid to be measured.

The tension spring may be provided with different strengths. It has been found that for liquefied nitrogen, a float made of aluminum and a spring having a tension force from about 0.26 to 0.35 pounds would be useful in construction of the gauge. The float and lift rod form a displacer. The density of the float and the tension force of the spring can be varied to provide the desired length of travel for the displacer, and therefore, the magnet at the top of the lift rod. The following calculations exemplify the calculations involved. The calculations can be performed in any number of orders depending upon the selected variables.

The displacer is comprised of the float and lift rod and related parts. Assume it is desired to determine the displacer travel for a particular displacer configuration and a particular spring. Calculations are exemplified as follows: assume the float selected is 0.312 inches in diameter and 38 inches in length, having a volume of 2.905 cubic inches, a weight of 0.2876 pounds, and is made of aluminum. Assume that the lift rod to be used is a stainless steel rod 0.125 inches in diameter and 18 inches long, having a volume of 0.2209 cubic inches and a weight of 0.0623 pounds. Thus, the totals for the displacer are a weight of 0.35 pounds and a volume of 3.125 cubic inches. Therefore, the density of the displacer is equal to 0.35 pounds divided by 3.125 cubic inches, giving a density of 0.112 pounds per cubic inch or 193 pounds per cubic foot. Assume that the spring is made from stainless steel wire which is 0.025 inches in diameter (d=diameter wire) and is coiled to form a spring having a mean diameter (D=diameter spring) of 0.475 inches. Assume that the spring has 138 coils (N=number of coils) and has a tension of 11,000,000 pounds per square inch (G=shearing modulus. The deflection (Y) of the spring is equal to:

$$Y = \frac{8(F)(N)(D)^3}{(d^4)(G)}$$

Substituting the values in the equation results in the following:

$$Y_I = \frac{8(.35)(138)(.475)^3}{(.025)^4(11,000,000)}$$

yielding an initial deflection of 9.63 inches. Assume that the cryogenic fluid is nitrogen. The density of liquid nitrogen is 50.4 pounds per cubic foot.

The buoyancy with the displacer fully submerged is equal to the volume of the displacer times the density of the fluid displaced or F(BUOY)=((3.125 cubic inches) (50.4 pounds/ cubic foot)) (1728 $in^3/ft^3$)=0.091 pounds. Thus, the weight on the spring if the fully-submerged position is F(SPRING)= 0.35 pounds–0.091 pounds=0.259 pounds. Spring deflection can then be recalculated for when the displacer is fully submerged as $$Y = \frac{8(F)(N)(D)^3}{(d^4)(G)}$$

$$Y_F = \frac{8(.259)(138)(.475)^3}{(.025)^4(11,000,000)}$$

yielding a deflection of 7.13 inches when the displacer is fully submerged. Thus, the displacer travel is equal to $Y_I - Y_F = 9.63 - 7.13 = 2.5$ inches. In this example, the ratio of the displacer density to liquid nitrogen density is 193 divided by 50.4, which equals 3.8. To maintain displacer travel within a reasonable approximation of the 2.5 inches, the density of the displacer could be between 3.5 to 4.0 times the density of the liquid nitrogen.

Thus, the present invention allows for use of different springs and a number of adjustment mechanisms to tailor and adjust a single gauge mechanism to different fluids. These adjustments occur by one or more of the following modes: varying the density of the material utilized for the lift assembly; varying the location at which the float is attached to the lift rod; adjusting the position of the float on the lift rod; and varying the location of the second spring guide along the lift rod. Adjustments may be also had by changing the position of the upper spring guide.

Figure 5:
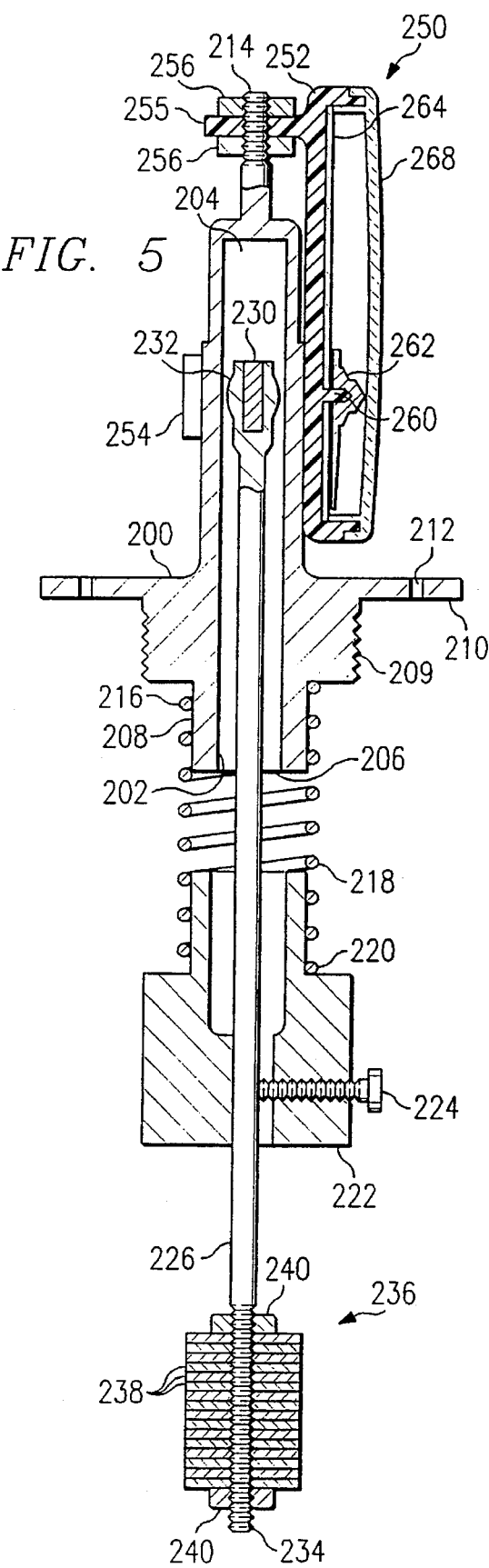
FIG. 5 is a cross-sectional view of an alternate embodiment of the present invention.

FIG. 5 shows yet another embodiment of the present invention. In this embodiment, a head 200 is provided, defining a passageway 202 having a first end 204 and a second end 206. The outer surface of head 200 proximate to second end 206 of passageway 202 is fashioned to form a spring guide mounting area 208. Adjacent to the spring guide mounting area 208 is threaded surface 209 providing for contact with the vessel. Above threaded surface 209 is a shoulder 210 for mating with the tank. The gauge can also be affixed to a tank by deleting threaded surface 209 and providing shoulder 210 with passageways 212 for mounting bolts. The first end 204 of the passageway is closed, and extending therefrom is adjustment nut post 214.

Attached to spring guide mounting area 208 is first end 216 of spring 218. Second end 220 of spring 218 is attached to lower spring guide 222. Lower spring guide 222 supports adjustment nut 224. Set screw 224 locks lift rod 226 in a predetermined position in relation to the lower spring guide 222. At the top of lift rod 226 is magnet 230. The top or first end of lift rod 226 may be provided with bearing surfaces 232. At the lower or second end 234 of lift rod 226 is float 236. Float 236 is made up of a set of washer-like sections 238 which are held in position by lock nuts 240. This construction has the advantage that the position of float 236 along lift rod 226 can be easily varied by changing positions of the lock nuts 240. Also, the size and dimension of the float may be expanded or contracted by removing or adding washer-like sections 238. Additionally, the overall density of float 236 may be varied by placing alternating layers of washers made of material having different densities. Attached to the head 200 is dial assembly 250. Dial assembly 250 has a back 252 with a protruding snap clamp 254, which engages the outer portion of head 200 adjacent to passageway 202. A second protrusion from back 252 is adjustment nut surface 255 which is positioned between two adjustment nuts 256. Thus, by changing the position of adjustment nuts 256, the location of dial assembly 250 in relation to passageway 202 may be varied. Extending from the front portion of the back 252 is pivot pin 260. Pivotally attached to pivot pin 260 is indicator 262. The front face 264 of back 252 may have indicating marks placed directly on it. Finally, a crystal 268 covers the base, completing dial assembly 250. In this embodiment, indicator 262 is magnetized such that its position will vary as magnet 230 moves in passageway 202.

As will be appreciated by those skilled in the art, a number of variations of the adjustment nut arrangement for the dial assembly may be employed. Also, as one skilled in the art will recognize, a number of mounting arrangements for movably attaching the lift rod to the lower spring guide can be employed. If desired, the spring guide can be nonadjustable in relation to the lower spring guide; however, such an arrangement makes the overall assembly less immersible.

I claim:

1. A dial assembly for use in conjunction with a float magnet of a float assembly which moves in response to the changes in fluid level in a vessel comprising:
   (a) a base having first and second sides;
   (b) a pivot pin extending from the first side of said base;
   (c) a pointer assembly having a magnet attached thereto pivotally mounted on said pivot pin which is movable in response to movements of said float magnet;
   (d) a snap clamp projecting from the second side of said base dimensioned to slidably engage a float assembly; and
   (e) an adjustment nut engaging means on said second side of said base for rotational cooperation with an adjustment nut of said float assembly and being movable therewith when said snap clamp engages said float assembly to permit positioning the dial assembly at predetermined locations in relation to said float magnet of the float assembly.

2. The dial assembly of claim 1 further comprising a dial face located between said base and said pointer assembly.

3. The dial assembly of claim 1 wherein said adjustment nut engaging means is an indentation on the second side of the base.

4. A gauge assembly comprising:
   (a) a float assembly having:
      (1) a head defining a passageway having first and second ends, said first end of said passageway being closed and said second end being open, said head having a threaded surface adjacent to said first end of said passageway;
      (2) a spring having first and second ends, said first end attached adjacent to said second end of said passageway in said head;
      (3) a lift rod adjustably attached to said second end of said spring, said lift rod having first and second ends;
      (4) a magnet attached to the first end of said lift rod and movable within said passageway of said head;
      (5) a float attached to said second end of said lift rod;
      (6) an adjustment nut engaging said threaded surface of said head; and
   (b) a dial assembly adjustably mounted adjacent to said passageway of said head having:
      (1) a base having first and second sides and having a pivot pin extending from the first side of said base;
      (2) means for slidably attaching said base to said float assembly;
      (3) a pointer assembly having a magnet attached thereto, said pointer pivotally attached to said pivot pin and movable in response to changes in the position of magnet attached to said lift rod; and
      (4) an adjustment nut engaging means on said second side of said base which is movable with said adjustment nut for causing said dial assembly to move along said passageway to allow varying the position of said magnet of said pointer assembly with respect to said passageway.

5. The gauge of claim 4 wherein said slidable attaching means comprises a snap clamp projecting from said base.

6. The gauge of claim 4 wherein the float has a density in the range of 0.093 to 0.101 pounds per cubic inch.

7. A float assembly for use in cryogenic gauges comprising:
   (a) a head defining a passageway having an axis and having a first and second ends and said head having an outer surface;
   (b) a threaded surface adjacent to the said first end of said passageway on the outer surface of said head;
   (c) a threaded adjustment nut engaging said threaded surface, said nut being movable along said axis and having means to provide for cooperation and engagement with a sliding dial assembly to provide for adjustment of dial readings;
   (d) a first spring guide having a passageway therethrough attached to the second end of said passageway;
   (e) a spring having first and second ends, said first end attached to said first spring guide;
   (f) a second spring guide attached to the second end of said spring;
   (g) a lift rod having first and second ends, said lift rod being adjustably attached to said second spring guide and said lift rod being movable within said passageway of said head;
   (h) a magnet attached to said first end of said lift rod; and
   (i) a float attached to said second end of said lift rod.

8. A gauge assembly comprising:
   (a) a float assembly, which moves in response to changes in fluid level in a vessel having:
      (1) a head defining a passageway, said passageway having first and second ends, said first end of said passageway being closed and said second end being open and said head having an exterior threaded surface;
      (2) a spring having first and second ends, said first end being attached to said head adjacent to said second end of said passageway;
      (3) a lift rod, said lift rod having first and second ends;
      (4) first magnet attached to said first end of said lift rod, said lift rod being movable within said passageway of said head;
      (5) a float adjustably attached to said second end of said lift rod;
      (6) said lift rod being adjustably attached to said second end of said spring, thereby allowing for adjustment of said float attached to said lift rod to a desired position in said vessel;
      (7) an adjustment nut threadedly engaging said threaded surface with a spring interposed between a top of said adjustment nut and said head;
   (b) a dial assembly slidably mounted adjacent to said passageway of said head having:
      (1) a base having a pivot pin, said base also having a clamping member for slidably engaging said head of said float assembly; and (2) a pointer assembly comprising a second magnet attached to an indicating arm which is pivotally attached to said pivot pin;
(3) a dial face located between said base and said pointer assembly; said dial face having volume indicia;
(4) said second magnet movable in response to changes in position of said first magnet in said passageway;
(5) said dial assembly having an adjustment nut engaging means on the outside of said base for rotatably engaging said adjustment nut to permit positioning of the dial assembly along the head.

9. The gauge of claim 8 wherein said clamping member of said base is a snap clamp projecting from said base and slidably engaging said head.

10. The gauge of claim 8 wherein the float has a density in the range of 0.093 to 0.101 pounds per cubic inch.

11. The float assembly of claim 8 further comprising a spring guide attached to said second end of said spring, said spring guide having a lock nut threadedly mounted thereon and also having a locking sleeve or ferrule interposed in a cavity between said spring guide and said lock nut, wherein said lift rod is adjustably attached to said spring guide at a desired point of attachment when said lock nut is tightened, which squeezes said locking sleeve axially between said lock nut and said spring guide which causes said locking sleeve to expand laterally and substantially engage said lift rod locking it in place, thereby allowing for calibration of said float assembly position inside said vessel.

12. The assembly of claim 7 further comprising a spring interspersed between said adjustment nut and said head, said spring applying pressure to said nut to hold said nut at predetermined locations in respect to said head.

* * * * *